US009031205B2

(12) United States Patent
Thomson et al.

(10) Patent No.: US 9,031,205 B2
(45) Date of Patent: May 12, 2015

(54) AUTO-DETECTION OF ENVIRONMENT FOR MOBILE AGENT (71) Applicant: Avaya Inc., Basking Ridge, NJ (US)

(72) Inventors: Rodney A. Thomson, Westminster, CO (US); Brian J. Reynolds, Firestone, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/025,674

(22) Filed: Sep. 12, 2013

(65) Prior Publication Data

US 2015/0071415 A1    Mar. 12, 2015

(51) Int. Cl.
*H04M 1/24* (2006.01)
*H04M 3/08* (2006.01)
*H04M 3/22* (2006.01)
*H04M 3/00* (2006.01)
*H04M 5/00* (2006.01)
*H04M 3/51* (2006.01)

(52) U.S. Cl.
CPC .................. *H04M 3/5175* (2013.01)

(58) Field of Classification Search
CPC ............ H04M 3/5175; H04M 3/5183; H04M 3/5233; H04M 3/5191; H04M 3/5232; G10L 15/00; G10L 15/20
USPC ................. 379/1.01, 8, 22.08, 32.01, 100.05, 379/102.01, 106.01, 265.01, 265.03, 379/265.04, 265.06, 266.09, 373.01, 376.01
See application file for complete search history.

(56) References Cited

U.S. PATENT DOCUMENTS

| | | | |
|---|---|---|---|
| 5,724,416 A * | 3/1998 | Foladare et al. | 379/202.01 |
| 6,349,136 B1 * | 2/2002 | Light et al. | 379/202.01 |
| 7,142,894 B2 * | 11/2006 | Ichikawa et al. | 455/569.1 |
| 7,392,066 B2 * | 6/2008 | Haparnas | 455/567 |
| 8,019,050 B2 | 9/2011 | Mactavish et al. | |
| 8,139,744 B2 | 3/2012 | Carlson et al. | |
| 8,160,234 B2 * | 4/2012 | Diethorn | 379/265.11 |
| 8,218,751 B2 * | 7/2012 | Hepworth et al. | 379/204.01 |
| 8,634,543 B2 | 1/2014 | Flockhart et al. | |
| 2003/0153364 A1 * | 8/2003 | Osann, Jr. | 455/567 |
| 2003/0185369 A1 | 10/2003 | Oliver et al. | |
| 2004/0242160 A1 * | 12/2004 | Ichikawa et al. | 455/67.13 |
| 2004/0260547 A1 * | 12/2004 | Cohen et al. | 704/233 |
| 2008/0084969 A1 | 4/2008 | Moore | |
| 2009/0052677 A1 * | 2/2009 | Smith | 381/56 |
| 2009/0274292 A1 * | 11/2009 | Diethorn | 379/265.11 |
| 2010/0080374 A1 * | 4/2010 | Hepworth et al. | 379/202.01 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0200183 A1 | 8/2011 | Erhart et al. | |
| 2012/0087671 A1 * | 4/2012 | Eber et al. | 398/106 |
| 2014/0046659 A1 * | 2/2014 | Burton et al. | 704/226 |

* cited by examiner

*Primary Examiner* — Binh Tieu
(74) *Attorney, Agent, or Firm* — Sheridan Ross P.C.

(57) ABSTRACT

An automatic ambient environmental detection and lockout system that recognizes unacceptable background noise for agents and a method that requires agents and/or supervisors to take corrective action on detected noise issues prior to work assignment facilitates an effective and efficient environment appropriate for agents to handle contact center work.

20 Claims, 4 Drawing Sheets

AUTO-DETECTION OF ENVIRONMENT FOR MOBILE AGENT

FIELD OF THE DISCLOSURE

The present disclosure is generally directed toward communications and more specifically toward contact centers.

BACKGROUND

Remote agents need a mechanism to determine whether an environment is adequate for taking voice calls. Ambient noise levels may not be appropriate for an agent to take calls since the noise levels can impact his or her ability to hear the call or to be heard, especially when using SIP-based telephony. Agents have no way to be notified of issues with ambient noise, nor are they given an opportunity to fix the issues.

Many companies live with background noise on contact center floors and noise from home telephone lines when agents are allowed to work remotely. Some agents often use mute to keep ambient noise to a minimum. Some companies and/or agents also invest in high-quality noise-cancellation headsets and filters to enhance noise suppression. Some remote agents try to work in a dedicated quiet and secure office or room. Supervisors set ground rules, written guidelines, and policies for acceptable behaviors and practices.

SUMMARY

With advantages like flexibility, mobility, agent happiness and other positives, it would be advantageous for agents and supervisors to have a system that provides a quality ambient noise level check prior to an agent receiving work and/or a contact regardless of work location. It would also be useful to include a mechanism that allows the agent and/or the supervisor to take corrective action or risk being blocked from work assignment and/or call handling.

These and other needs are addressed by the various aspects, embodiments, and/or configurations of the present disclosure. The present disclosure is directed to an automatic ambient environmental detection and lockout system that recognizes unacceptable background noise for agents and a method that requires agents and/or supervisors to take corrective action on detected noise issues prior to work assignment.

Contact center agents that can work from home are becoming increasingly popular. With good guidelines and management, remote agents are encouraged to work hard and enthusiastically. Working remotely, agents can provide a quieter environment than a busy contact center floor, agents enjoy working for companies that may not be local to them, and agents have higher attendance and worker satisfaction with the flexibility of working from home.

While remote agent use has become a popular way to find enthusiastic and skilled workers, to handle peak hours, to provide 24/7 coverage, and to improve worker satisfaction and retention, there can be drawbacks. It can be difficult to tightly regulate the conditions in which a remote agent takes calls. The calls can be monitored manually and adjustments can be requested, made, or required, but an automated way to provide information to remote agents to give them a chance to correct the noise level without supervisor intervention is desirable.

When a remote agent logs in to take calls, a system can listen to ambient noise to determine whether the remote agent is in a location with an allowable level of ambient noise. This may be accomplished by looking at voice data for irregularities or spikes in audio using an algorithm for detecting ambient noise at a certain level, based on either defined tolerances and/or thresholds based on Quality of Service (QoS) statistics. Attempts to fool the system by muting an endpoint can be detected algorithmically. If the ambient noise is determined to be unacceptable, the agent is notified of the issue(s) and given an opportunity to fix the problem before accepting work. The system may provide a mechanism for the ambient noise to be repeatedly checked or manually trigged to check until an acceptable noise level is achieved. If the ambient noise is not fixed after a certain number of tries, which may be set by an administrator, the system may update the agent's status to block his or her ability to handle voice-related work so that no further calls are directed to the agent. Additionally, the system can invoke a block at any time before or during the call to indicate a potential QoS issue, resulting in automatic flagging of the call for adjustment to appropriate ambient noise and QoS levels.

For example, a remote agent Sally may be working from home. Sally has the window open since it's a nice day. Sally logs in, and a neighbor's dog starts barking. The barking sets off a chain reaction and soon several dogs near Sally's house are barking. The system detects that Sally's environment is not appropriate for receiving voice work items. The system prompts Sally to take corrective action. Sally gets up and closes the window and moves to the other end of her office, which is a little quieter. The system runs a check, and Sally's environment has an acceptable ambient noise level. The system then allows Sally to go ready and take work items, including calls. However, If Sally was not able to change her environment, the system would note this and not allow voice calls to be routed to her. Sally may still be allowed to handle other types of requests, such as email or chat until ambient noise is at an acceptable level.

In additional embodiments, the system may automatically monitor and test for environmental sounds like household devices (e.g., vacuum, washing machine, etc.) and entertainment devices (e.g., radio, TV, etc.) in addition to sounds discussed previously.

Although embodiments of the present disclosure will be described in connection with monitoring ambient noise for remote contact center agents, it should be appreciated that the features disclosed herein do not need to be limited to a contact center environment. Specifically, embodiments of the present disclosure can be used to check ambient noise levels before admission of any type of call, not just contact center calls. Moreover, embodiments of the present disclosure are not limited to audio embodiments. Instead, aspects of the present disclosure may also provide the ability to monitor a video background for "noise" in the form of moving objects, distractions, confidential information, vulgar language, offensive objects, etc. Thus, environment monitoring and call admission can be achieved in voice and/or video calls and are not limited to voice calls in a contact center.

These and other advantages will be apparent from the disclosure. In some embodiments, a method is provided that generally comprises:

analyzing an environment surrounding a potential participant to a call;

determining whether the environment surrounding the potential participant comprises noise that violates a noise threshold set for calls involving the potential participant; and limiting the potential participant's ability to participate in calls unless and until the environment surrounding the potential participant complies with the noise threshold.

The term "automatic" and variations thereof, as used herein, refers to any process or operation done without material human input when the process or operation is performed.

However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The term "user," "customer," or "client" denotes a party patronizing, serviced by, or otherwise doing business with a contact center and/or an enterprise business.

The phrase "go ready" as used herein refers to an agent's action of logging in and being available to take calls. A ready state refers to an agent's telephone, computer, and/or other communication devices in a workstation that are in service and may be matched to work items.

The phrase "Quality of Service" or "QoS" as used herein refers to aspects of computer networks and telephony requirements for a connection, including but not limited to crosstalk, echo, signal-to-noise ratio, loudness levels, etc. QoS may provide priority to certain types of communications which may be guaranteed by using certain bit rates, delay, jitter, packet dropping probability, etc.

The terms "determine," "calculate," and "compute," and variations thereof as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

DETAILED DESCRIPTION

Figure 1:
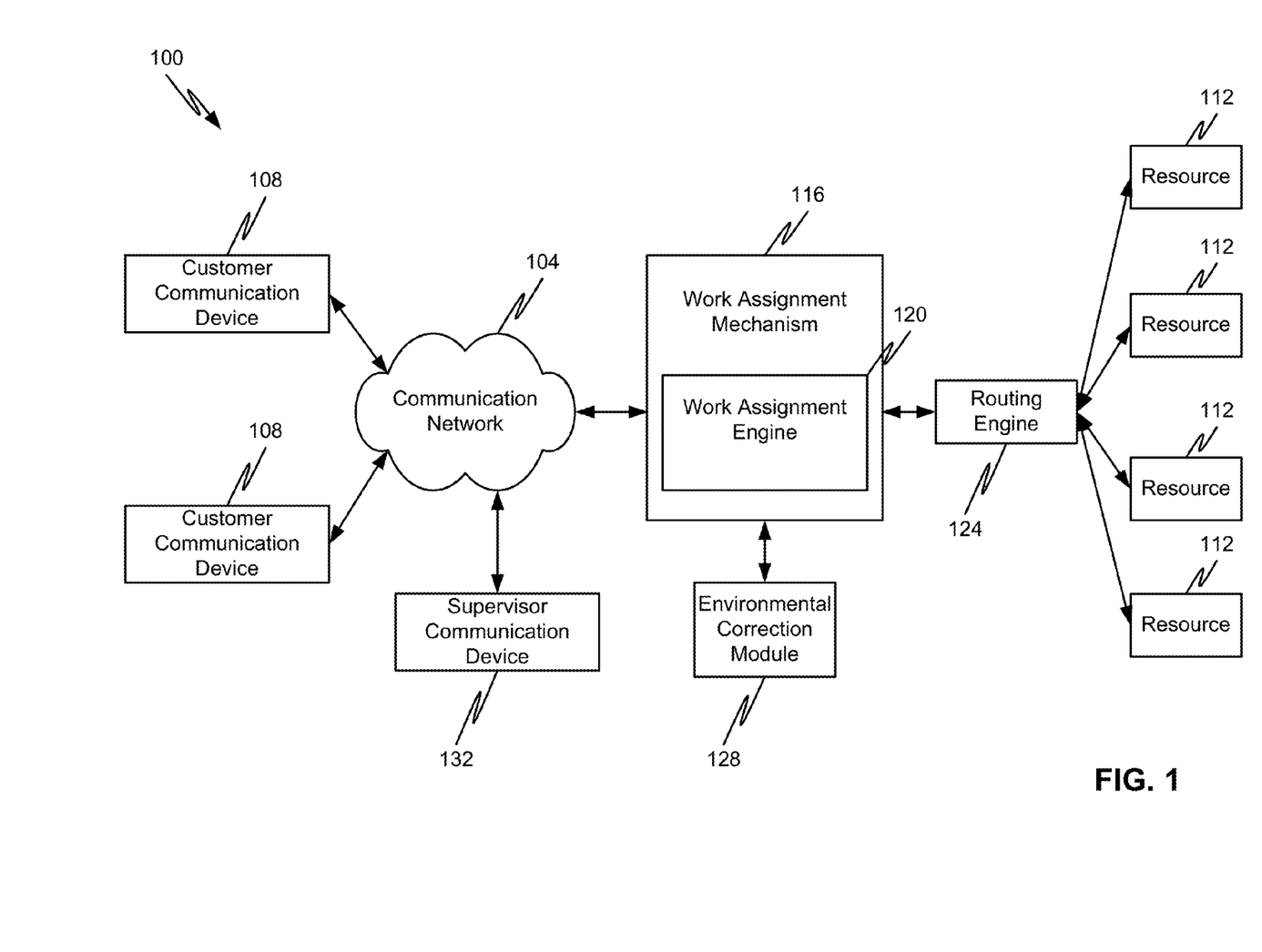
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more customer communication devices 108 and one or more supervisor communication devices 132 to a work assignment mechanism 116, which may be owned and operated by an enterprise administering a contact center in which a plurality of resources 112 are distributed to handle incoming work items from the customer communication devices 108 and may be managed with the use of a supervisor communication device 132.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize the communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, each of which are hereby incorporated herein by reference in their entirety.

The communication device 132 may correspond to supervisor communication device or collection of devices. In accordance with at least some embodiments of the present disclosure, a supervisor may utilize the communication device 132 to evaluate or help the handling of the work item by a resource 112. The supervisor may utilize the communication device 108 to initiate or respond to interaction regarding work items with the work assignment mechanism 116, an environmental correction module 128, elements within or outside of the communication network 104, and to processing resources 112.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 124 to connect the communication device 108 to the assigned resource 112.

Although the routing engine 124 is depicted as being separate from the work assignment mechanism 116, the routing engine 124 may be incorporated into the work assignment mechanism 116 or its functionality may be executed by the work assignment engine 120.

In accordance with at least some embodiments of the present disclosure, the communication devices 108, 132 may comprise any type of known communication equipment or collection of communication equipment. Examples of suitable communication devices 108, 132 include, but are not limited to, a personal computer, laptop, tablet, cellular phone, smartphone, telephone, or combinations thereof. In general, each communication device 108, 132 may be adapted to support video, audio, text, and/or data communications with other communication devices 108, 132 as well as the processing resources 112. The type of medium used by the communication devices 108, 132 to communicate with other communication devices 108, 132 or processing resources 112 may depend upon the communication applications available on the communication devices 108, 132.

In accordance with at least some embodiments of the present disclosure, the work item is sent toward a collection of processing resources 112 via the combined efforts of the work assignment mechanism 116 and routing engine 124. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112a-n connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can determine which of the plurality of processing resources 112 is qualified and/or eligible to receive the work item and further determine which of the plurality of processing resources 112 is best suited (or is the optimal processing resource) to handle the processing needs of the work item. In situations of work item surplus, the work assignment engine 120 can also make the opposite determination (e.g., determine optimal assignment of a work item resource to a resource). In some embodiments, the work assignment engine 120 is configured to achieve true one-to-one matching by utilizing bitmaps/tables and other data structures.

The work assignment mechanism 116 can communicate with the environmental correction module 128 which may attempt to detect environmental conditions and allow or disallow login by a processing resource 112 accordingly.

Figure 2:
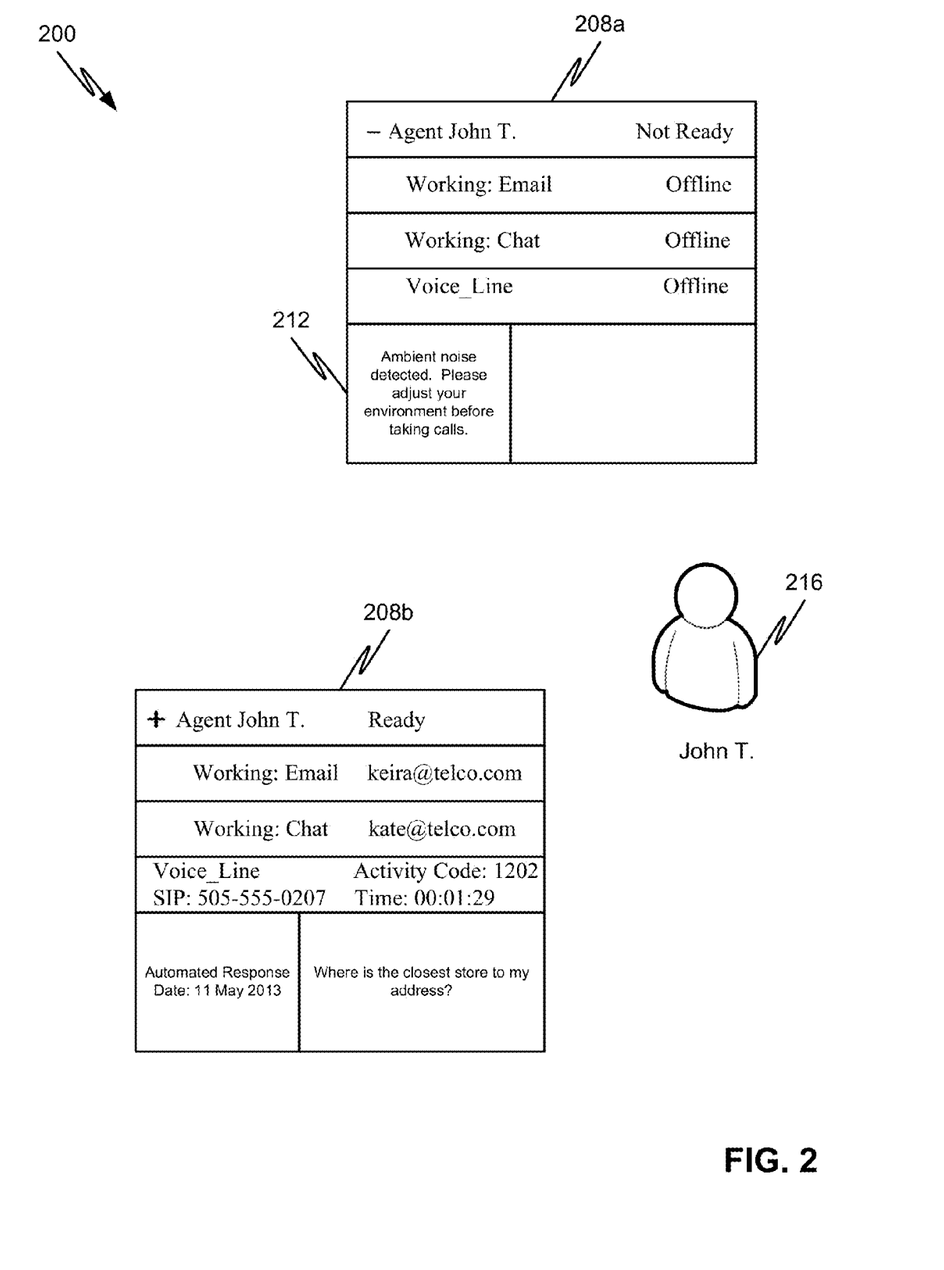
FIG. 2 is an example of a contact center agent user interface in accordance with embodiments of the present disclosure.

FIG. 2 depicts a user interface 200 for an agent 216 in a contact center in accordance with embodiments of the present disclosure. The phrase "contact center" as used herein refers to a company that manages client correspondence through a variety of mediums, including telephone, fax, email, mail, chat, text, etc.

The contact center agent user interface can contain one or more lines, bars, and/or windows of information displays, commonly referred to as an agent desktop 208, operable to integrate with applications and additional data sources. The agent desktop 208 may display many types of information, including but not limited to, telephony and multimedia functions including accept, release/reject, originate, hold/unhold, transfer, conference, ready/not ready, logged in/logged out, Dual-Tone Multi-Frequency (DTMF), emergency, supervisor, customer details, customer search, contact search, ticket information, history, schedule callback, email, instant message, and user settings. The agent desktop 208 can include more or fewer elements, and elements of the agent desktop 208 can be arranged differently and interact differently than those shown in FIG. 2.

In a non-limiting example, an agent John T. 216 may have an agent desktop 208. When John T. 216 is logged in but not yet taking work items, the agent desktop 208a may give indications regarding the status of John T. 216. The first line of the agent desktop 208a may show the status of John T. 216 as Not Ready. The "–" and the Not Ready indicator designations mean that although agent John T. 216 is logged in, he will not be assigned nor can he accept work items from the work assignment engine 120 and/or the routing engine 124. The second and third lines of the agent desktop 208a may show the status of communication applications, including email and chat. Since agent John T. 216 is in the Not Ready state, both email and chat applications may show status as Offline. The fourth line of the agent desktop 208a may show that agent John T. 216 is not on a telephone call, displaying the status of the voice line as Offline. In particular, a text box may display a text message 212 from the environmental correction module 128 if the ambient noise is unacceptable. The environmental correction module 128 may send the text message 212 to the agent desktop 208a, "Ambient noise detected. Please adjust your environment before taking calls." John T. 216 sees the text message 212 and realizes that it is too noisy in his home office to take calls, which was determined by an analysis executed by the communication system 100 when he logged in. John T. 216 gets up from his desk and closes a window. He assumes that because there is a construction crew building a house on the lot next door, the ambient noise may be such that the communication system 100 prevents him from going ready and taking work items.

When John T. 216 returns to his desk, he may attempt to go ready again so that he can take work items. The communication system 100 may run an additional analysis of the environment surrounding John T. 216. If there are no ambient sound issues and/or QoS issues detected during the environmental analysis, the communication system 100 may allow John T. 216 to go ready. John T. 216 goes ready based on feedback from the successful analysis. The indicators on the agent desktop 208b may change since John T. 216 is now in the ready state, including showing status as "+" and Ready. Since agent John T. 216 is in the Ready state, lines two and three with email and chat application displays may show newly assigned work item contacts as "keira@telco.com" and "kate@telco.com." Since agent John T. 216 is in the Ready state, the fourth line of the agent desktop 208a may show that agent John T. 216 has answered a voice call and is actively engaged on the call, with an Automatic Number Identification (ANI) display of "505-555-0207." Agent John T. 216 may have chosen and entered an activity code of "1202," with the display thus indicating he is on a sales call. Information may be provided on additional lines and/or in boxes that is related to the work items that have been assigned and accepted by agent John T. 216 now that he is actively taking work.

Though the example above illustrates the use of the text message 212 when the ambient noise level has been tested and deemed unacceptable, the message can also be in the form of an icon, flashing alert, full screen display, or any other system indicator that a problem has been detected by the communication system 100. Additionally, the text message 212 or other system indicator from the environmental correction module 128 may be sent to indicate a potential Quality of Service (QoS) issue, resulting in the automatic flagging of the call for adjustment to appropriate QoS levels and preventing the agent from taking additional work items until the issue is corrected once the call has been completed and/or terminated. In still other embodiments, the text message 212 may be transmitted in response to detecting an acceptable environment around John T. 216 instead of being transmitted in response to detecting an unacceptable environment.

Figure 3:
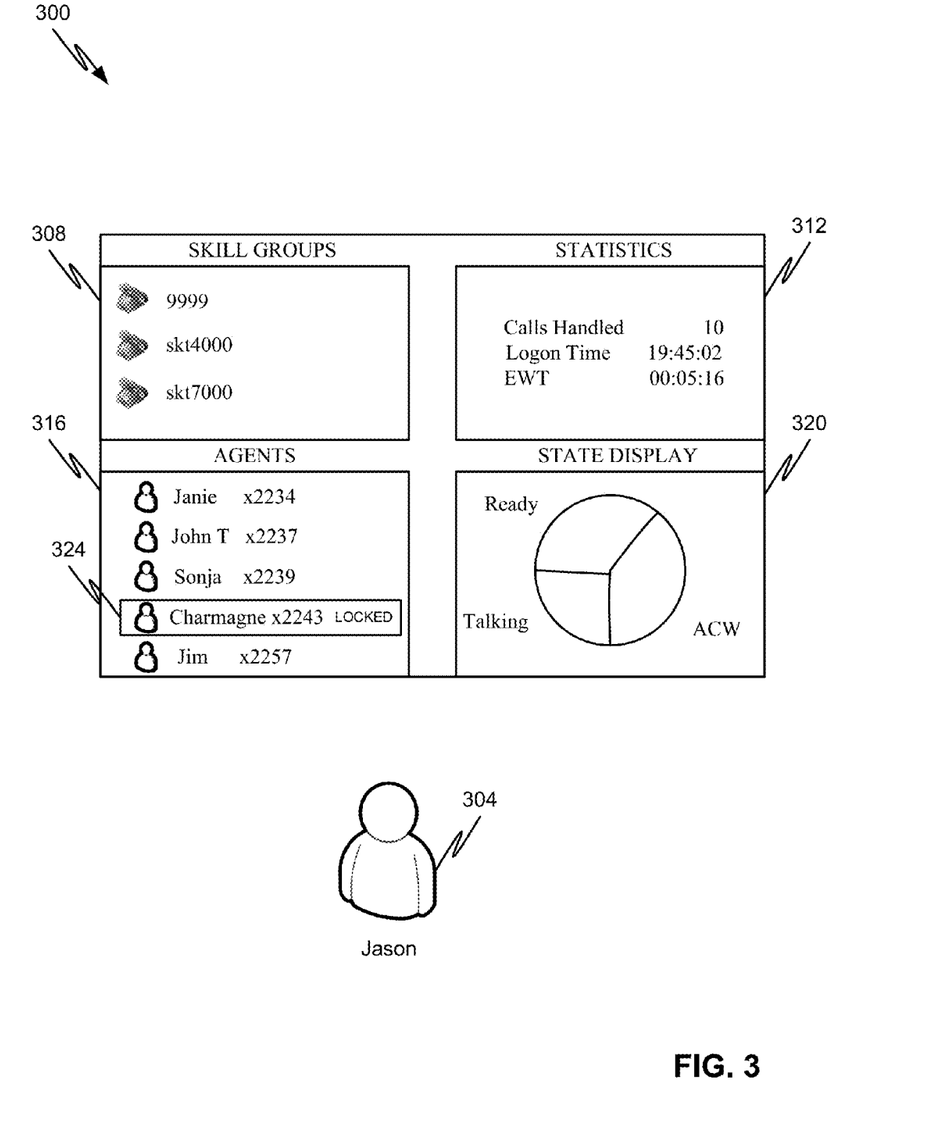
FIG. 3 is an example of a contact center supervisor user interface in accordance with embodiments of the present disclosure.

Referring now to FIG. 3, a user interface 300 is depicted for a supervisor 304 in a contact center in accordance with embodiments of the present disclosure. The user interface 300 can be provided by or in connection with a user output device (e.g., a display) of a supervisor communication device 128. The user interface 300 can be operable to receive information from the environmental correction module 128 which is operable to communicate with the work assignment mechanism 116, and/or in connection with a companion application, such as a specially provided application and/or a browser application, provided as part of an agent supervisor communication device 128 display. Accordingly, the user interface 300 is generally presented to the supervisor 304. Moreover, the user interface 300 can be interactive in that it can provide fields, buttons, menus, and features to enable the user interface 300 to receive input from administered data sources as well as to present information to the supervisor 304 graphically.

In one embodiment, the supervisor 304 may have a smart phone as a communication device 132. A smart phone may correspond to a particular type of communication device that generally is mobile, cordless, connected via wireless/3G/4G, and capable of browsing, telephony, and geo-location. The smart phone may be a telephone or a tablet or other functionally-similar device. The supervisor communication device 132 may be operable to run applications related to the supervision of the communication system 100. The supervisor communication device 132 may be operable to receive calls, short message service (SMS) texts, pop-ups, and data as well as operable to receive displays from other contact center data elements.

For example, a supervisor Jason 304 may have a display on his supervisor communication device 132. In FIG. 3, four representative display areas are shown, though there may be more or fewer, in any combination. Display box 308 may include a list of skills that are active, like "9999" and "skt4000" and "skt7000" that function under supervisor Jason's 304 watchful eye. Display box 312 may present statistics that supervisor Jason 304 has asked the system administrator to display for him, including statistics like "Calls Handled 10" and "Logon Time 19:45:02" and Estimated Wait Time "EWT 00:05:16." Display box 316 may list the agents and/or resources 112 for which supervisor Jason 304 is responsible, including an extension number for each, like "Janie x2234" and "John T. x2237" and "Sonja x2239" and "Charmagne x2243" and "Jim x2257." Display box 320 may present a state display, including a graph showing how many agents and/or resources 112 are in a ready state, talking on a call, and in after call work (ACW).

Of particular note, within display box 316 that provides a list of agents and/or resources 112 and extensions, a special indicator may be displayed if agent Charmagne 324 has a status of LOCKED. Jason 304 had the system administrator set the threshold to three times. Charmagne's 324 status may be locked at Not Ready because her environment was tested by the communication system 100 and found to be unacceptable for taking work items, especially voice calls. Once an agent like Charmagne 324 attempts to go ready three times and her environment fails the test every time, the communication system 100 through the environmental correction module 128 may alert Jason 304 that Charmagne 324 is locked out, which may require Jason's 304 intervention.

Figure 4:
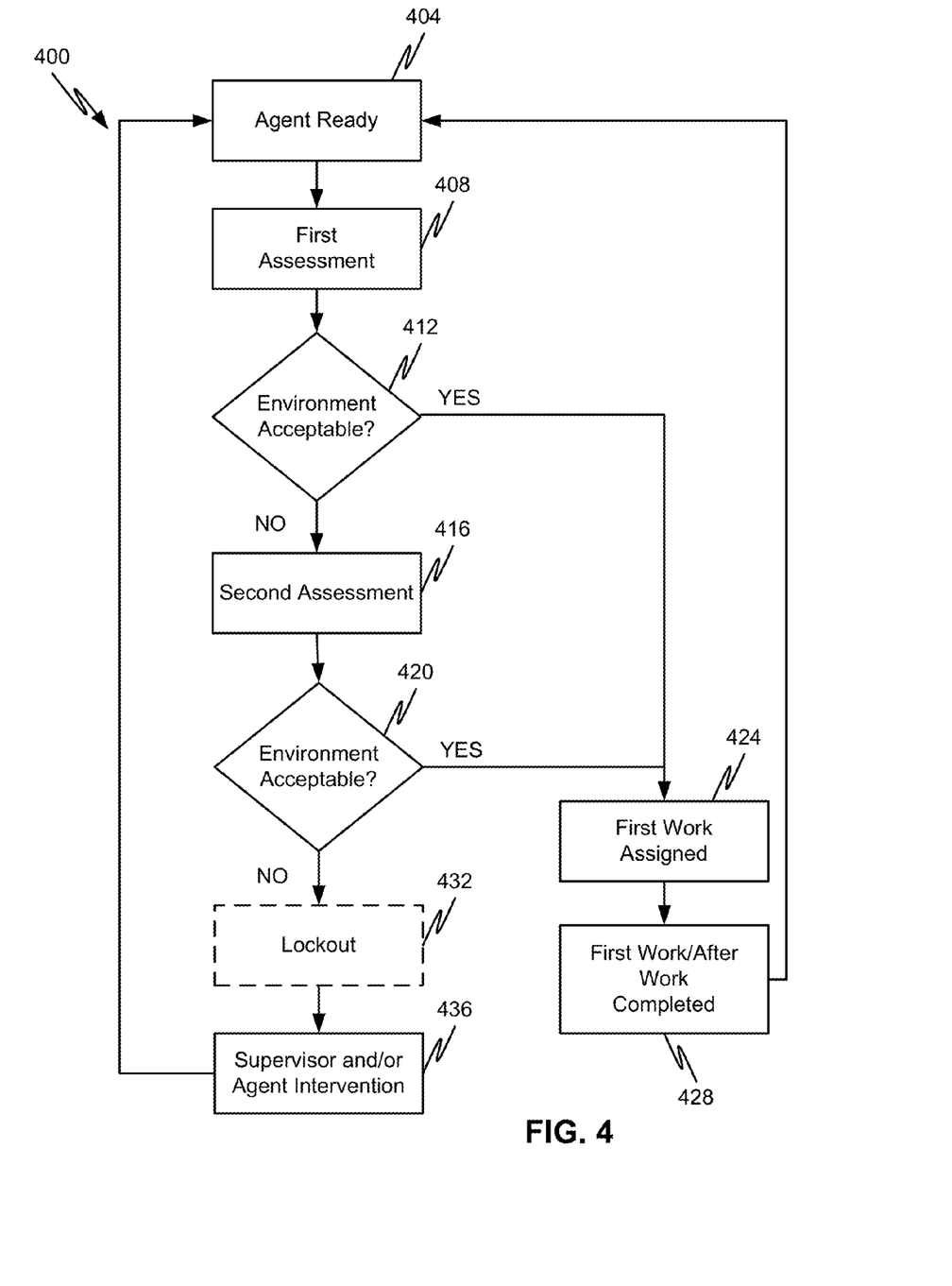
FIG. 4 depicts a flow diagram for environmental condition detection in accordance with embodiments of the present disclosure.

A method 400 for environmental condition detection in accordance with embodiments of the present disclosure is shown in FIG. 4. Generally, the method 400 begins when an agent goes ready, in step 404. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a computer readable medium. Further, the method may also be embodied by a set of gates or other structures in an Application Specific Integrated Circuit (ASIC), a Field Programmable Gate Array (FPGA), or other configurable hardware component, module, or system. Hereinafter, the method 400 shall be explained with reference to the systems, components, modules, software, data structures, etc. described in conjunction with FIGS. 1-3.

Typically, the agent 112 logs in and attempts to go ready, in step 404. The communication system 100 is alerted that the agent 112 is ready to work. The environmental assessment and/or analysis may be initiated, in step 408, where a channel is opened for a first environmental assessment. If the environment is found to have acceptable ambient noise levels in step 412, a first work item may be assigned to the agent 112 (step 424). The agent 112 may accept and complete the assigned first work item and complete any after-work notes or follow-up in step 428. Once the work has been completed in step 428, the method 400 may return back to step 404 or terminate (not shown). A return back to step 404 may cause the agent to re-enter the AVAILABLE or READY state.

In step 412, if the communication system 100 detects through the open channel that the ambient noise level is unacceptable, the agent 112 may be blocked from going ready. The agent 112 may be notified via the agent user interface 208a in the text message 212 that the environment does not meet the requirements for acceptable ambient noise level for taking work items, especially voice and/or video calls. The agent may then be provided with an opportunity to adjust the environment to comply with the requirements for an acceptable ambient noise level. After the agent 112 makes adjustments, the agent 112 may again attempt to go ready, prompting the communication system 100 to re-open the same channel or a different channel and begin a second assessment and/or analysis of the environment surrounding the agent 112, in step 416. In step 420, if the environment has acceptable ambient noise levels, the agent 112 is allowed to go ready and a first work item may be assigned to the agent 112 (step 424). The agent 112 may accept and complete the assigned first work item as well as any after work notes or follow-up in step 428, and may attempt to go ready again, in step 404.

In step 420, the system may make a second determination that ambient noise levels are not within acceptable thresholds. If a threshold has been set by an administrator for the number of unsuccessful assessments and/or analyses, an optional lockout may occur in step 432 if the ambient noise levels continue to be found unacceptable. In step 436, the supervisor 304 and/or the agent 112 may make corrections to the environment and/or the system to unlock the agent 112 and/or may initiate a post-mortem review of the environmental issues. Once the environment has been fixed, the agent 112 may once again be ready for a system assessment and/or analysis, in step 404.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method, comprising:

analyzing an environment surrounding a potential participant to a first call;

determining whether the environment surrounding the potential participant comprises noise that violates a noise threshold set for calls involving the potential participant;

limiting the potential participant's ability to participate in a future call unless and until the environment surrounding the potential participant complies with the noise threshold;

determining that the first call has completed;

in response to determining that the first call has completed, re-analyzing the environment surrounding the potential participant; and re-determining whether the environment surrounding the potential participant comprises noise that violates the noise threshold set for calls involving the potential participant.

2. The method of claim 1, wherein the first call comprises a voice call.

3. The method of claim 1, further comprising:
providing the potential participant with an opportunity to adjust the environment surrounding the potential participant; and
after the opportunity to adjust the environment surrounding the potential participant has been provided to the potential participant, re-determining whether the environment surrounding the potential participant comprises noise that violates the noise threshold.

4. The method of claim 1, wherein the determining step comprises opening a communication channel with the potential participant and monitoring the communication channel for ambient noise.

5. The method of claim 1, further comprising:
generating a message that describes results of the determining step; and
providing the message to the potential participant.

6. The method of claim 1, wherein the potential participant corresponds to a contact center agent that works remotely and the environment surrounding the contact center agent is outside a premises of the contact center.

7. The method of claim 1, wherein the first call comprises a video call.

8. The method of claim 1, further comprising:
generating a message that describes results of the determining step; and
providing the message to a supervisor of the potential participant.

9. A non-transitory computer-readable medium comprising processor-executable instructions, that when read by a processor the instructions cause the processor to perform:
analyzing an environment surrounding a potential participant to a call;
determining whether the environment surrounding the potential participant comprises noise that violates a noise threshold set for calls involving the potential participant;
limiting the potential participant's ability to participate in a future call unless and until the environment surrounding the potential participant complies with the noise threshold;
allowing the potential participant to engage in a first call;
determining that the first call has completed;
in response to determining that the first call has completed, re-analyzing the environment surrounding the potential participant; and
re-determining whether the environment surrounding the potential participant comprises noise that violates the noise threshold set for calls involving the potential participant.

10. The computer-readable medium of claim 9, wherein the first call comprises a voice call, the instruction causing the processor to further perform:
providing the potential participant with an opportunity to adjust the environment surrounding the potential participant; and
after the opportunity to adjust the environment surrounding the potential participant has been provided to the potential participant, re-determining whether the environment surrounding the potential participant comprises noise that violates the noise threshold.

11. The computer-readable medium of claim 9, wherein the determining step comprises opening a communication channel with the potential participant and monitoring the communication channel for ambient noise, the instruction causing the processor to further perform:
locking the potential participant out of a contact center environment until the environment surrounding the potential participant complies with the noise threshold;
generating a message that describes results of the determining step; and
providing the message to the potential participant.

12. The computer-readable medium of claim 9, wherein the potential participant corresponds to a contact center agent that works remotely and the environment surrounding the contact center agent is outside a premises of the contact center.

13. The computer-readable medium of claim 9, wherein the first call comprises a video call, the instruction causing the processor to further perform:
providing the potential participant with an opportunity to adjust the environment surrounding the potential participant; and
after the opportunity to adjust the environment surrounding the potential participant has been provided to the potential participant, re-determining whether the environment surrounding the potential participant comprises noise that violates the noise threshold.

14. The computer-readable medium of claim 9, wherein the determining step comprises opening a communication channel with the potential participant and monitoring the communication channel for ambient noise, the instruction causing the processor to further perform:
locking the potential participant out of a contact center environment until the environment surrounding the potential participant complies with the noise threshold;
generating a message that describes results of the determining step; and
providing the message to a supervisor of the potential participant.

15. A communication system, comprising:
an environmental correction module configured to analyze an environment surrounding a potential participant to a call and perform the following operations:
determine, whether the environment surrounding the potential participant comprises noise that violates a noise threshold set for calls involving the potential participant; and
limit the potential participant's ability to participate in a future call unless and until the environment surrounding the potential participant complies with the noise threshold;
an environmental correction module configured to perform the following operations:
allow the potential participant to engage in a first call;
determine that the first call has completed;
in response to determining that the first call has completed, re-analyze the environment surrounding the potential participant; and
re-determine whether the environment surrounding the potential participant comprises noise that violates the noise threshold set for calls involving the potential participant.

16. The system of claim 15, wherein the first call comprises a voice call.

17. The system of claim 15, further comprising:
an environmental correction module configured to perform the following operations:

provide the potential participant with an opportunity to adjust the environment surrounding the potential participant; and after the opportunity to adjust the environment surrounding the potential participant has been provided to the potential participant, re-determine whether the environment surrounding the potential participant comprises noise that violates the noise threshold.

18. The system of claim 15, wherein the environmental correction module configured to perform the determining step opens a communication channel with the potential participant and monitors the communication channel for ambient noise.

19. The system of claim 15, further comprising:
an environmental correction module configured to perform the following operations:
generate a message that describes results of the determining step; and
provide the message to at least one of the potential participant and a supervisor of the potential participant.

20. The system of claim 15, wherein the first call comprises a video call.

* * * * *